US008145571B2

(12) United States Patent
Jothipragasam et al.

(10) Patent No.: US 8,145,571 B2
(45) Date of Patent: Mar. 27, 2012

(54) CONTENT TRANSFER CONTROL FOR WIRELESS DEVICES

(75) Inventors: Premkumar Jothipragasam, San Diego, CA (US); Daniel H. Agre, Rancho Santa Fe, CA (US); Michal James Koenig, Encinitas, CA (US); Nakul Duggal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 11/202,700

(22) Filed: Aug. 12, 2005

(65) Prior Publication Data

US 2006/0282394 A1 Dec. 14, 2006

Related U.S. Application Data

(60) Provisional application No. 60/684,660, filed on May 25, 2005.

(51) Int. Cl.
*G06F 21/00* (2006.01)
(52) U.S. Cl. ............... 705/59; 705/51; 705/57; 705/58; 726/30; 380/201; 380/202
(58) Field of Classification Search .............. 705/50–79; 380/201, 202; 726/30
See application file for complete search history.

(56) References Cited

U.S. PATENT DOCUMENTS

| 6,697,944 | B1 * | 2/2004 | Jones et al. ................ 713/168 |
| 7,089,594 | B2 * | 8/2006 | Lal et al. ........................ 726/31 |
| 7,546,641 | B2 * | 6/2009 | Robert et al. ................ 726/30 |
| 7,757,299 | B2 * | 7/2010 | Robert et al. ................ 726/30 |
| 7,822,201 | B2 * | 10/2010 | Shamoon et al. ............. 380/201 |
| 7,912,451 | B2 * | 3/2011 | Eckhart ........................ 455/410 |
| 2002/0010681 | A1 * | 1/2002 | Hillegass et al. ............... 705/59 |
| 2002/0052885 | A1 * | 5/2002 | Levy ............................. 707/200 |
| 2002/0077988 | A1 * | 6/2002 | Sasaki et al. .................. 705/59 |
| 2002/0107806 | A1 * | 8/2002 | Higashi et al. ................. 705/51 |
| 2005/0021815 | A1 * | 1/2005 | Haneda et al. ............... 709/231 |
| 2005/0044146 | A1 * | 2/2005 | Nassor et al. ................ 709/205 |
| 2005/0182727 | A1 * | 8/2005 | Robert et al. .................. 705/51 |

(Continued)

FOREIGN PATENT DOCUMENTS

DE 10308011 A1 9/2004

(Continued)

OTHER PUBLICATIONS

"From Context to Content:Leveraging Context to Infer Media Metadata" Marc Davis, Simon King, Nathan Good, and Risto Servas, Oct. 10-16, 2004, New York, New York, USA.*

(Continued)

*Primary Examiner* — Jamie Kucab
*Assistant Examiner* — Mamon Obeid
(74) *Attorney, Agent, or Firm* — Abdollah Katbab; Won Tae Kim

(57) ABSTRACT

A content transfer control system for a wireless device and a method of controlling content transfer from a wireless device are described. The system includes a content transfer control component arranged to (a) detect licensed content and (b) transfer a content source indicating a source of the licensed content responsive to detection of licensed content. The method includes transmitting content from the wireless device if the content is not determined to be licensed content and transmitting a content source from the wireless device if the content is determined to be licensed content.

14 Claims, 7 Drawing Sheets

U.S. PATENT DOCUMENTS

| | | | |
|---|---|---|---|
| 2006/0212705 A1* | 9/2006 | Thommana et al. | 713/176 |
| 2007/0192875 A1* | 8/2007 | Yoon et al. | 726/27 |
| 2007/0209078 A1* | 9/2007 | Yoon et al. | 726/26 |
| 2007/0240229 A1* | 10/2007 | Yoon et al. | 726/27 |
| 2007/0289025 A1* | 12/2007 | Tanaka et al. | 726/28 |
| 2008/0207165 A1* | 8/2008 | Eckhart | 455/410 |
| 2009/0125722 A1* | 5/2009 | Gomaa et al. | 713/176 |
| 2011/0047080 A1* | 2/2011 | Im et al. | 705/59 |

FOREIGN PATENT DOCUMENTS

| | | |
|---|---|---|
| JP | 11154121 | 6/1999 |
| JP | 2002288453 | 10/2002 |
| JP | 2003051771 | 2/2003 |
| JP | 2003067194 | 3/2003 |
| WO | WO2004077786 | 9/2004 |

OTHER PUBLICATIONS

International Search Report—PCT/US06/020638, International Search Authority—European Patent Office—Oct. 10, 2006.

Wrtten Opinion—PCT/US06/020638, International Search Authority—European Patent Office—Oct. 10, 2006.

\* cited by examiner

CONTENT TRANSFER CONTROL FOR WIRELESS DEVICES

CLAIM OF PRIORITY UNDER 35 U.S.C. §119

The present Application for Patent claims priority to Provisional Application No. 60/684,660 entitled "CONTENT TRANSFER CONTROL FOR WIRELESS DEVICES" filed May 25, 2005, and assigned to the assignee hereof and hereby expressly incorporated by reference herein.

FIELD

The disclosed embodiments relate to content transfer control for wireless devices.

BACKGROUND

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, these smaller and more powerful personal computing devices are typically severely resource constrained. For example, the screen size, amount of available memory and file system space, amount of input and output capabilities and processing capability may each be limited by the small size of the device. Because of such severe resource constraints, it is often typically desirable, for example, to maintain a limited size and quantity of software applications and other information residing on such remote personal computing devices (client devices).

FIG. 1 depicts a high level communication architecture for wireless devices in which wireless devices 100, 102 are connected to a wireless network 104 and a server 108 by way of the communication network. Server 108 stores content 110 in a storage medium (not shown), e.g., hard disk, memory, floppy disk, or other storage mechanism. Content 110 includes, for example, audio and video files, text files, application files, address book contents, etc., for transfer between server 108 and wireless device 100 or between wireless devices 100, 102. Wireless device 100 stores content 112 which may be content 110 obtained from server 108 via wireless network 104 or content (not shown) transferred to the wireless device by a user of the wireless device using a wired, e.g., cable connection, or wireless, e.g., infra-red protocol, Bluetooth wireless protocol, WiFi protocol, etc. connection to a processing device such as a computer system (not shown). For example, the user may transfer audio files from a home computer system to the wireless device.

FIG. 2 depicts a message sequence chart of operation of the transfer of content 110 from server 108 to wireless device 100. Wireless device 100 establishes a network connection (message sequence 200) with wireless network 104. After establishment of the network connection, wireless device 100 requests content 110 from server 108 (message sequence 202) by issuing a content request message. Responsive to receipt of the content request message from wireless device 100, server 108 transmits (message sequence 204) content 110 to wireless device 100 using network 104. After receipt of content 110, wireless device 100 may store the content in a storage medium (not shown) of the wireless device for later use.

If content transfer controls are not in place on wireless device 100, content that is unprotected from redistribution transferred to wireless device 100, whether from server 108 or a computer system of the user (not shown), may be transferred to other wireless devices, such as wireless device 102, without regard for any potential licensing issues. For example, content 110 may be a purchased audio file with terms restricting further distribution or use beyond wireless device 100.

SUMMARY

The present embodiments provide content transfer control for wireless devices.

A content transfer control system for a wireless device includes a content transfer control component arranged to (a) detect licensed content and (b) transfer a content source indicating a source of the licensed content responsive to detection of licensed content.

A method embodiment includes transmitting content from the wireless device if the content is not determined to be licensed content and transmitting a content source from the wireless device if the content is determined to be licensed content.

Still other advantages of the disclosed embodiments will become readily apparent to those skilled in the art from the following detailed description, wherein the preferred embodiments are shown and described, simply by way of illustration of the best mode contemplated of carrying out the embodiments. As will be realized, the embodiments are capable of other and different embodiments, and the several details are capable of modifications in various obvious respects, all without departing from the embodiments. The advantages of the disclosed embodiments may also be realized and attained by the means of the instrumentalities and combinations particularly pointed out in the appended claims.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
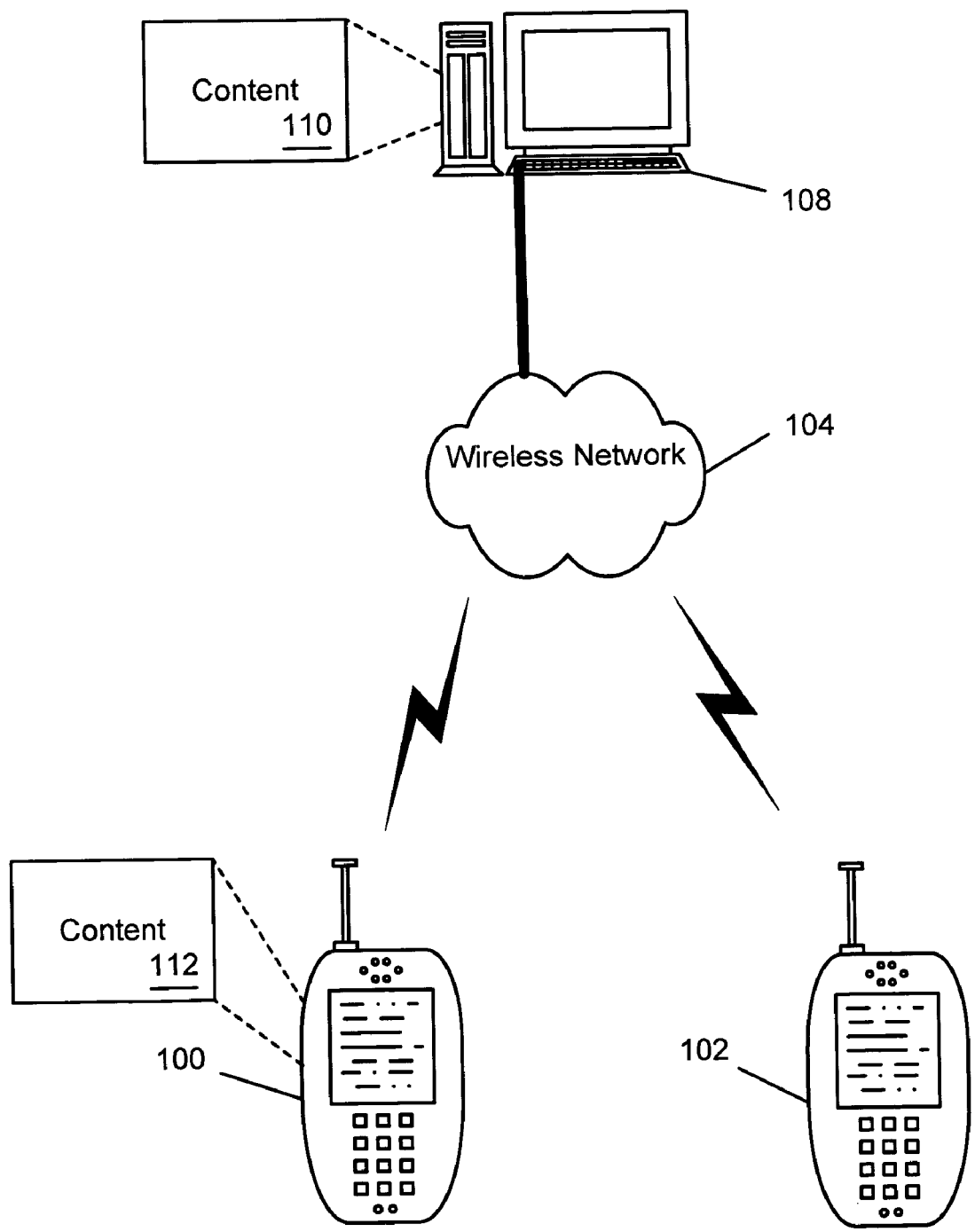
FIG. 1 is a high level diagram of a communication network for wireless devices.
Figure 2:
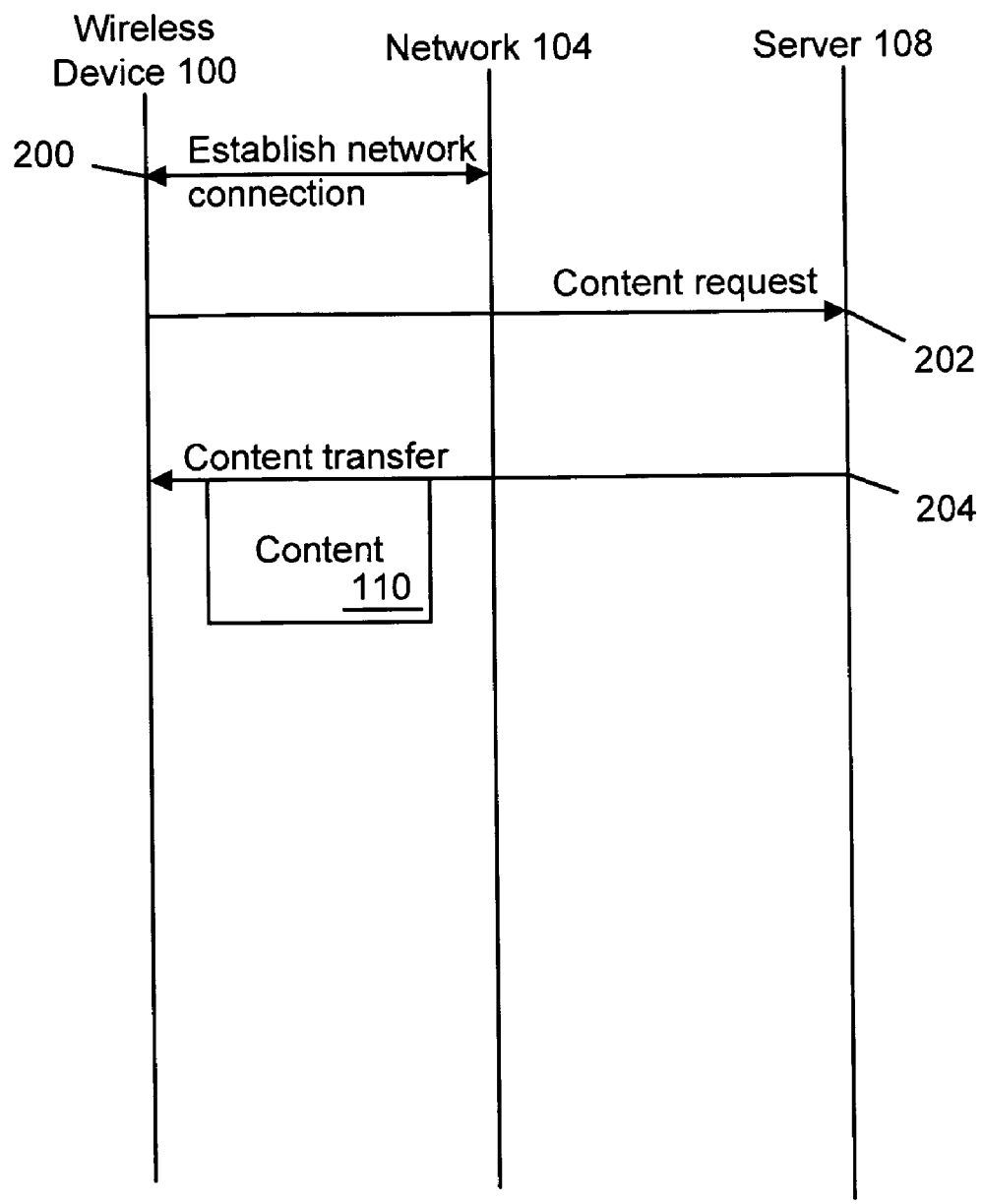
FIG. 2 is a message sequence chart of operation of content transfer with respect to FIG. 1.
Figure 3:
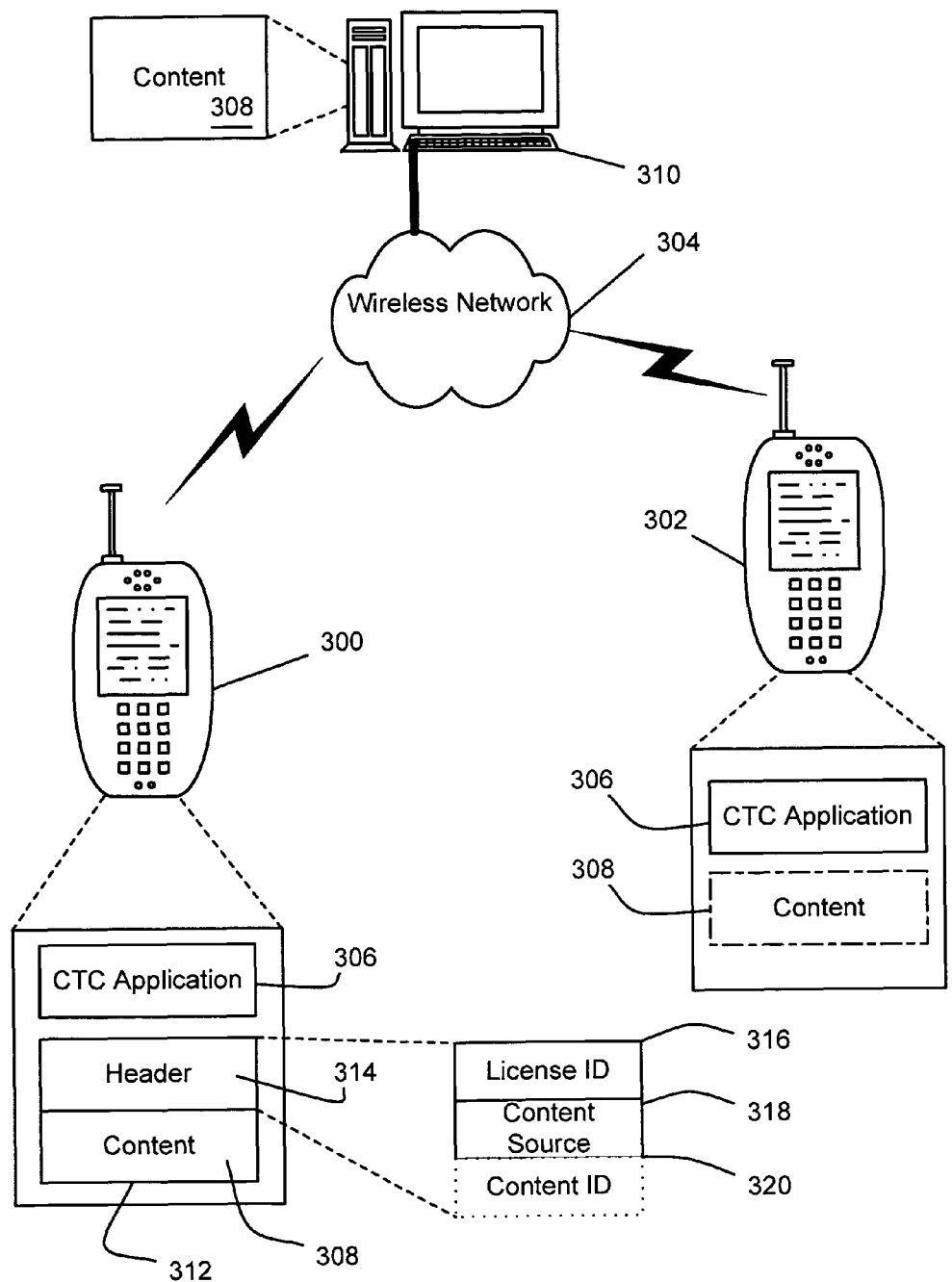
FIG. 3 is a high level diagram of a communication network according to an embodiment.

FIG. 3 depicts an embodiment for controlling content transfer between wireless devices 300, 302 connected to a wireless network 304, e.g., a code division multiple access (CDMA) network, a general packet radio service (GPRS) network, a universal mobile telecommunications system (UMTS) network, or other network. As depicted, wireless device 300 includes a content transfer control (CTC) application 306 used to obtain content 308 from server 310, e.g., purchase ring-tones, songs, or other audio, video, mixed media, or other content files, via wireless network 304. After obtaining content 308, execution of CTC application 306 by wireless device 300 enables control of the transfer of the content to other wireless devices, e.g., wireless device 302.

According to an embodiment, the CTC application 306 provides a mechanism for controlling communication of content 308 between wireless devices 300, 302 using wireless network 304. In particular, the present embodiments enable wireless devices 300, 302 to set up CTC application-controlled communication transfers to exchange content, e.g., audio, text, video, and other content.

A CTC application 306, i.e., a set of executable instructions, resident on each wireless device 300, 302, is executable to effect control of the exchange of content 308 between wireless devices 300, 302. As depicted, communication of content 308 between wireless devices 300, 302 occurs under control of CTC application 306. Further, as depicted, wireless device 302 may include content 308 (dash-dot line) for communication to wireless device 300.

Execution of CTC application 306, described more fully below in conjunction with FIGS. 4A, 4B, and 5, by wireless device 300 causes the creation of a content container 312 corresponding to the combination of content 308 and a CTC application-generated header 314. In an embodiment, CTC application 306 generates a header 314 for each content 308 obtained from server 310. In another embodiment, CTC application 306 generates a header 314 for each instance of content 308 without regard for the origination of the content, e.g., whether or not the content is obtained from server 310, a user computer system, or other mechanism. In another embodiment, content container 312 is encrypted and signed.

Header 314 includes a license identifier (ID) 316 specifying one or more of different license types applicable to content 308, a content source 318 specifying a location on wireless network 304 of the content associated with the header, and an optional content ID 320 (dotted line) specifying an identifier, e.g., an International Standard Book Numbering (ISBN) value, an International Standard Music Number (ISMN) value, an European Article Numbering (EAN) value, etc., identifying the content. License ID 316 may be an alphanumeric, numeric, alphabetic, or other representation of the license type applicable.

Subsequent to creation of header 314, a user causes execution of CTC application 306 by wireless device 300 to transfer content 308 to wireless device 302 via wireless network 304. In another embodiment, direct communication between wireless devices 300, 302 is contemplated. For example, a peer-to-peer communication mechanism, such as an infra-red, WiFi, Bluetooth, or other wireless device-to-wireless device server-less communication mechanism may be used.

Prior to transferring content 308, CTC application 306 determines whether license ID 316 of header 314 associated with content 308 permits transfer of content 308 to wireless device 302. If license ID 316 allows transfer of content 308, CTC application 306 enables the transfer of the content from wireless device 300 to wireless device 302. Conversely, if license ID 316 restricts transfer of content 308, CTC application 306 disables the transfer of the content between wireless devices 300, 302. Further, if the transfer of content 308 between wireless devices 300, 302 is restricted, CTC application 306 enables the transfer of content source 318 between wireless devices 300, 302 instead of content 308. In this manner, wireless devices 300, 302 are prevented from transferring license-restricted content 308; however, wireless device 302 is provided information, i.e., content source 318, enabling the wireless device to connect to server 310 and obtain licensed content 308.

FIG. 3 depicts an embodiment for controlling content transfer between wireless devices 300, 302 connected to a wireless network 304, e.g., a code division multiple access (CDMA) network, a general packet radio service (GPRS) network, a universal mobile telecommunications system (UMTS) network, or other network. As depicted, wireless device 300 includes a content transfer control (CTC) application 306 used to obtain content 308 from server 310 (also known as an external content provider). e.g., purchase ring-tones, songs, or other audio, video, mixed media, or other content files, via wireless network 304. After obtaining content 308, execution of CTC application 306 by wireless device 300 enables control of the transfer of the content to other wireless devices, e.g., wireless device 302.

In an embodiment, if no header 314 corresponds to content 308, CTC application 306 enables the transfer of the content between wireless devices 300, 302. In another embodiment, if no header 314 corresponds to content 308, CTC application 306 disables the transfer of the content between wireless devices 300, 302.

In another embodiment, content ID 320 enables the wireless devices 300, 302 to perform a search, e.g., using a search engine on server 310, to locate a lower cost source of content 308. That is, wireless device 302 may be used to shop for content 308 on other servers (not shown) accessible via wireless network 304. In this manner, a user of wireless device 300 is able to more easily search for content using content ID 320.

Figure 4A:
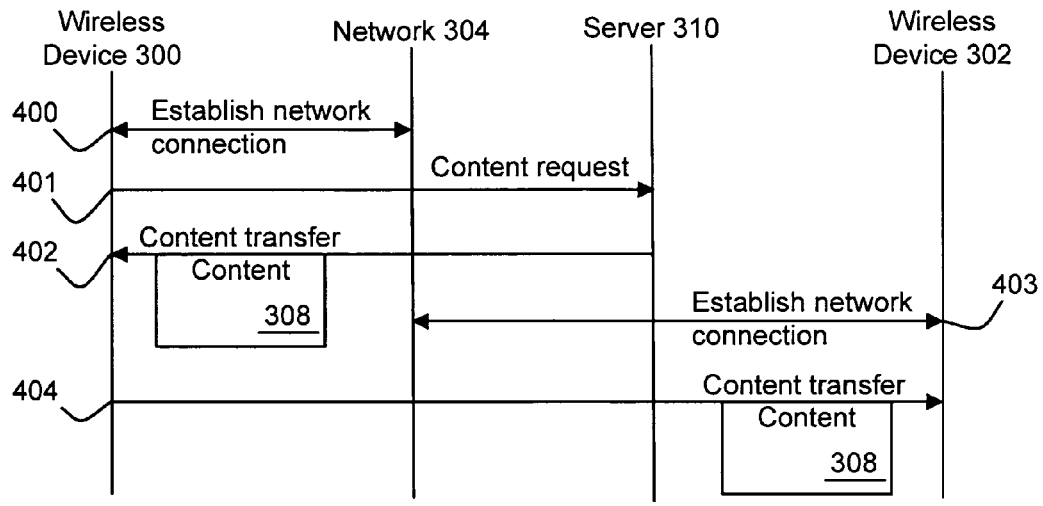
FIGS. 4A and 4B are message sequence charts of operation of the FIG. 3 embodiment.

FIG. 4A depicts operation of the FIG. 3 embodiment in the form of a message sequence diagram. Originating wireless device 300 establishes a network connection (message sequence 400). After establishment of the network connection, wireless device 300 requests content 308 from server 310 (message sequence 401) by issuing a content request message. Responsive to receipt of the content request message from wireless device 300, server 310 transmits (message sequence 402) content 308 unprotected from redistribution to wireless device 300 using network 304. After receipt of content 308, wireless device 300 may store the content in a storage medium (not shown) of the wireless device for later use.

Wireless device 302 establishes a network connection (message sequence 403). When the user of wireless device 300 desires to transfer content 308 to wireless device 302, the user manipulates the wireless device causing the execution of CTC application 306. Execution of CTC application 306 by wireless device 300 causes the CTC application to determine, based on license ID 316 in header 314 corresponding to content 308, if content 308 is able to be transferred between wireless devices 300, 302. After CTC application 306 determines content 308 is able to be transferred between wireless devices 300, 302, wireless device 300 transfers content 308 to wireless device 302 (message sequence 404). In another embodiment, CTC application 306 determines, based on the absence of a corresponding header 314 or license ID 316 corresponding to content 308 that the content is able to be transferred between wireless devices 300, 302. In an alternate embodiment, CTC application 306 determines, based on the absence of a corresponding header 314 or license ID 316 corresponding to content 308, that the content is restricted from being able to be transferred between wireless devices 300, 302.

Figure 4B:
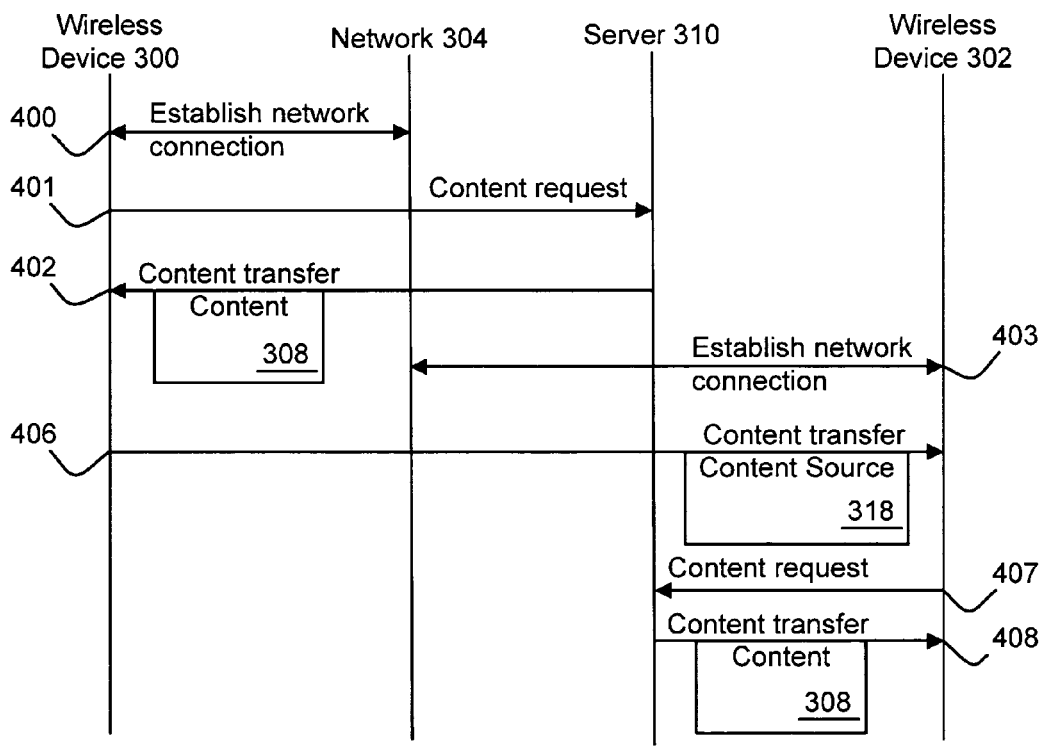

FIG. 4B depicts operation of the FIG. 3 embodiment in the form of a message sequence diagram. Originating wireless device 300 establishes a network connection (message sequence 400). After establishment of the network connection, wireless device 300 requests content 308 from server 310 (message sequence 401) by issuing a content request message. Responsive to receipt of the content request message from wireless device 300, server 310 transmits (message sequence 402) content 308 to wireless device 300 using network 304. In this case, content 308 is licensed such that the content is restricted from being able to be transferred to other wireless devices, e.g., wireless device 302. After receipt of content 308, wireless device 300 may store the content in a content container 312 in storage medium (not shown) of the wireless device for later use. In storing content 308, CTC application 306 generates a header 314 corresponding to the content and specifying the license restrictions specified by server 310.

Wireless device 302 establishes a network connection (message sequence 403). When the user of wireless device 300 desires to transfer content 308 to wireless device 302, the user manipulates the wireless device causing the execution of CTC application 306. Execution of CTC application 306 by wireless device 300 causes the CTC application to determine, based on license ID 316 in header 314 corresponding to content 308, if content 308 is able to be transferred between wireless devices 300, 302. After CTC application 306 determines content 308 is restricted from being transferred between wireless device 300, 302, wireless device 300 transfers content source 318 from header 314 corresponding to content 308 to wireless device 302 (message sequence 406).

After receipt of content source 318, wireless device 302 is able to issue a content request (message sequence 407) to server 310 requesting content 308 identified by content source 318. After receipt of the content request from wireless device 302, server 310 transfers (message sequence 408) content 308 to wireless device 302.

Figure 5:
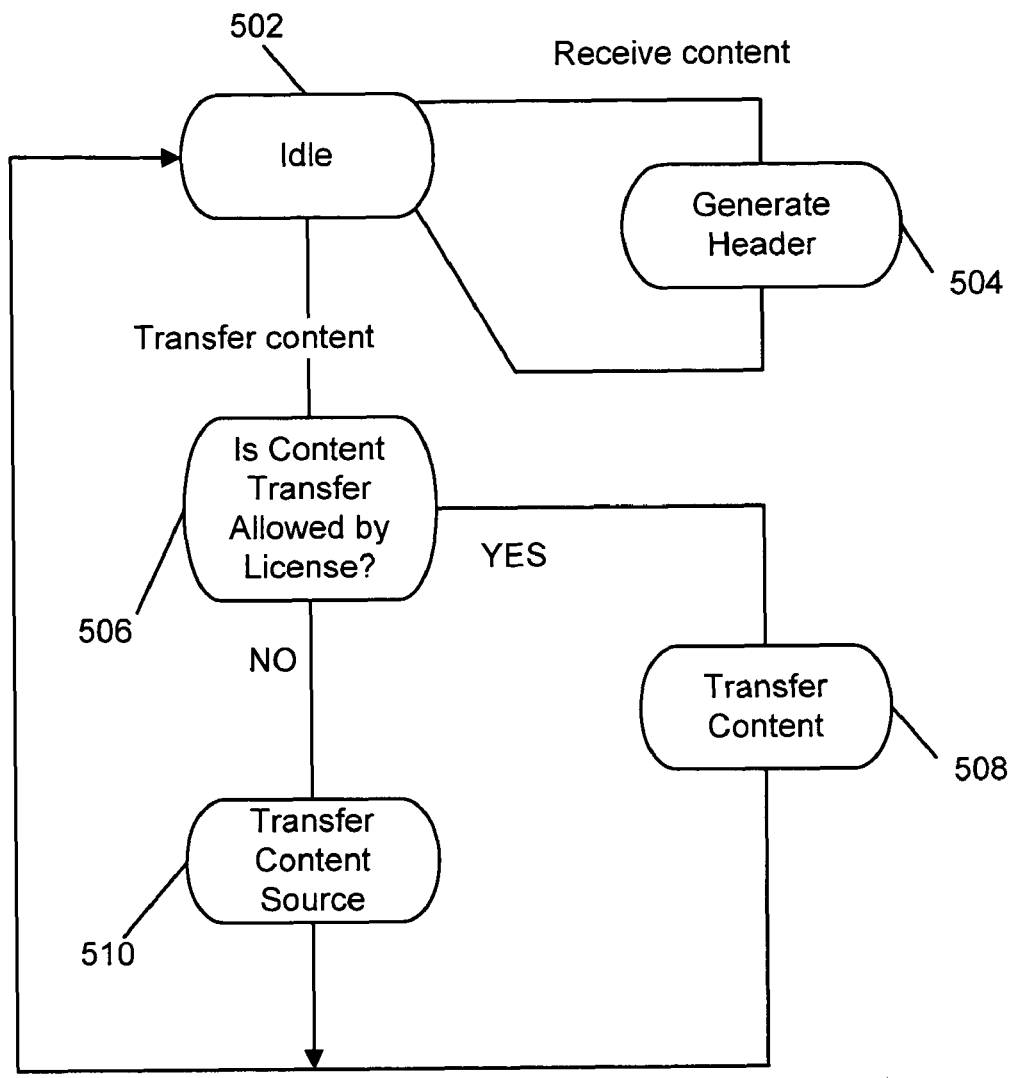
FIG. 5 is a high level functional flow chart of a portion of the process flow of a wireless device of FIG. 3.

FIG. 5 depicts a high level functional flow chart of a portion 500 of the process flow of operation of wireless device 300 in accordance with the FIG. 3 embodiment. As depicted in FIG. 5, wireless device 300 process flow begins operation in an idle state 502. After wireless device 300 receipt of content 308 from server 310, the flow transitions to generate header step 504. During step 504, execution of CTC application 306 by wireless device 300 generates a header 314 including license ID 316, content source 318, and optional content ID 320 as depicted in FIG. 3. License ID 316 is received from server 310 and content source 318 is specified based on the location of content 308 on server 310. After generating header 314, wireless device 300 stores the generated header along with received content 308 and the process flow transitions back to the idle step 502.

After wireless device 300 is manipulated to attempt to transfer content 308 to wireless device 302 by the user of the device, the flow transitions to step 506. During step 506, execution of CTC application 306 by wireless device 300 causes the CTC application to determine based on header 314, and more specifically license ID 316, the restrictions associated with content 308. If in step 506 CTC application 306 determines based on license ID 316 that transfer of content 308 is licensed, the flow transitions to step 508 and transfer of the content is enabled from wireless device 300 to wireless device 302. After content 308 transfers between wireless devices 300, 302, the flow transitions back to idle step 502. In another embodiment, if there is no license 316 corresponding to content 308, the determination at step 506 results in a licensed transfer determination, i.e., the flow transitions to step 508.

If in step 506 CTC application 306 determines that transfer of content 308 is not licensed, the flow transitions to step 510 and transfer of content is disabled and transfer of content source 318 is enabled between wireless devices 300, 302. It will be understood that in different embodiments different sequences of steps and transitions may be used to accomplish the embodiments described above. For example, determination of licensed or unlicensed content 308 in step 506 may entail decryption and/or signature verification performed by CTC application 306 or other supporting executable instructions executed by wireless device 300.

Wireless device 302 establishes a network connection (message sequence 403). When the user of wireless device 300 desires to transfer content 308 to wireless device 302, the user manipulates the wireless device causing the execution of CTC application 306. Execution of CTC application 306 by wireless device 300 causes the CTC application to determine, based on license ID 316 in header 314 corresponding to content 308, if content 308 is able to be transferred between wireless devices 300, 302. After CTC application 306 determines content 308 is able to be transferred between wireless devices 300, 302, wireless device 300 transfers content 308 to wireless device 302 (message sequence 404, may also be referred to as a first message). In another embodiment, CTC application 306 determines, based on the absence of a corresponding header 314 or license ID 316 corresponding to content 308 that the content is able to be transferred between wireless devices 300, 302. In an alternate embodiment, CTC application 306 determines, based on the absence of a corresponding header 314 or license ID 316 corresponding to content 308, that the content is restricted from being able to be transferred between wireless devices 300, 302.

Further, although the foregoing discussion describes the transfer of content 308 from an origination wireless device to a destination wireless device, the transfer direction may, in one or more embodiments, occur in the other direction and/or bi-directionally. That is, destination wireless device 302 may connect to and transfer content 308 to originating wireless device 300 and/or the wireless devices 300, 302 may transfer content to each other. Further still, in one or more embodiments, the origination wireless device may transfer content 308 to a network 304 connected computing device, e.g., a personal desktop or laptop computer, server, etc.

Some of the personal computing devices utilize application programming interfaces (APIs), sometimes referred to as runtime environments and software platforms, that are installed onto their local computer platform and which are used, for example, to simplify operations of such devices, such as by providing generalized calls for device specific resources. Further, some such APIs are also known to provide software developers the ability to create software applications that are fully executable on such devices. In addition, some of such APIs are known to be operationally located between the computing device system software and the software applications such that the computing device computing functionality is made available to the software applications without requiring the software developer to have the specific computing device system source code. Further, some APIs are known to provide mechanisms for secure communications between such personal devices (i.e., clients) and remote devices (i.e., servers) using secure cryptographic information.

After receipt of content source 318, wireless device 302 is able to issue a content request (message sequence 407) to server 310 requesting content 308 identified by content source 318. After receipt of the content request from wireless device 302, server 310 transfers (message sequence 408, may also be referred to as a second message) content 308 to wireless device 302.

One or more embodiments are used in conjunction with a runtime environment (API) executing on the computing device. One such runtime environment (API) is Binary Runtime Environment for Wireless® (BREW®) software previously discussed. However, one or more of the described embodiments can be used with other types of runtime environments (APIs) that, for example, operate to control the execution of applications on wireless client computing devices.

Figure 6:
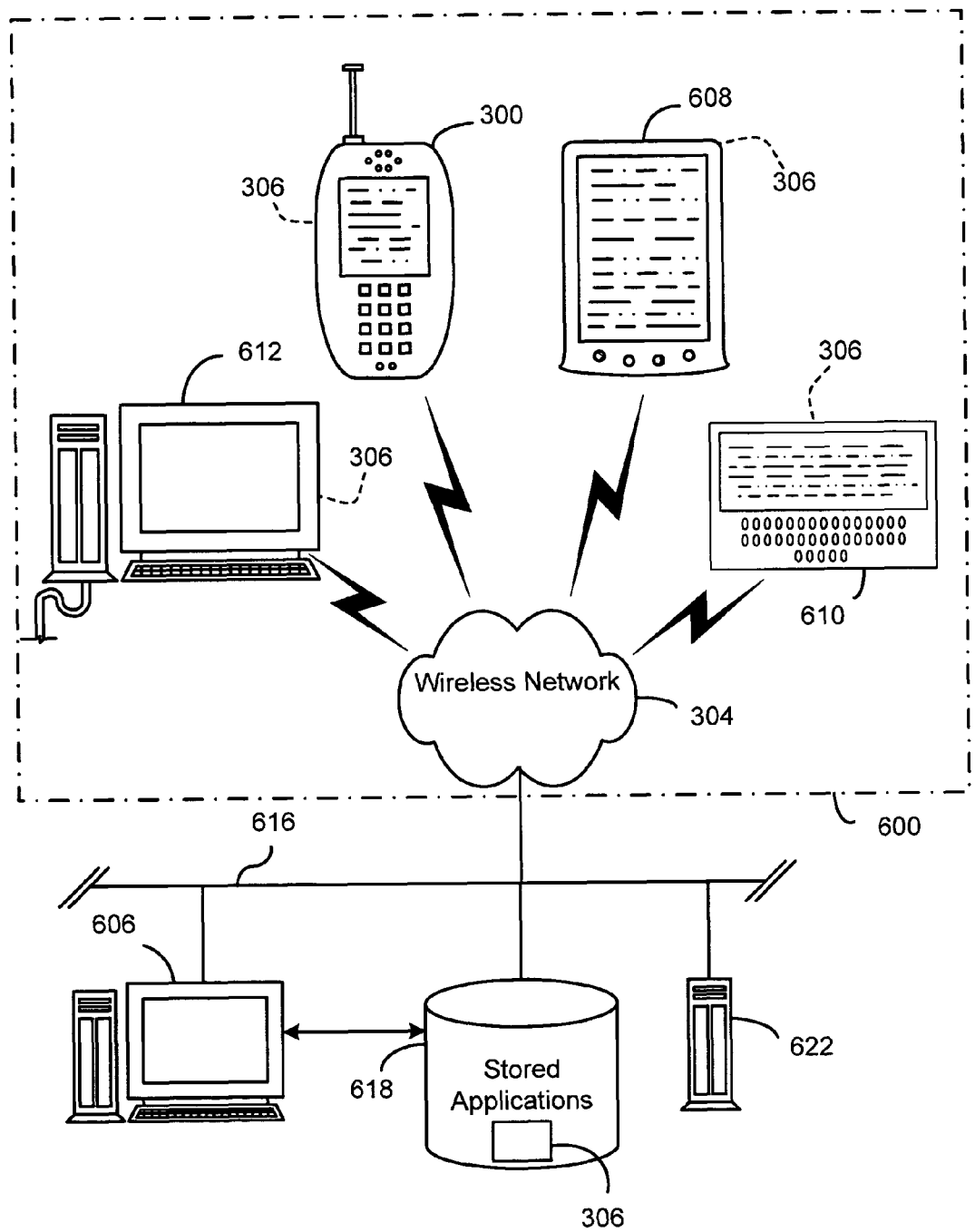
FIG. 6 is a diagram of a wireless network architecture that supports client devices and servers in accordance with at least one embodiment.

FIG. 6 illustrates a block diagram of one exemplary embodiment of a wireless system 600. System 600 can contain client devices, such as a cellular telephone, e.g., wireless device 300, in communication across a wireless network 304 with at least one application download server 606 that selectively transmits software applications and components to wireless devices, such as wireless devices 300, 302, across a wireless communication portal or other data access to the wireless network 304. As shown here, the wireless (client) device can be a cellular telephone, e.g., wireless device 300, a personal digital assistant 608, a pager 610, which is shown here as a two-way text pager, or even a separate computer platform 612 that has a wireless communication portal. For example, wireless device 300 includes a transceiver or communication device for transmitting and receiving data, a processor for executing instructions and controlling operation of the wireless device, and a memory for storing the executable instructions, content container 312, and content 308 (FIG. 3). The embodiments can thus be realized on any form of client device including a wireless communication portal, e.g., a communication device, including without limitation, wireless modems, PCMCIA cards, personal computers, access terminals, telephones, or any combination or sub-combination thereof.

The application download server 606 is shown here on a network 616 with other computer elements in communication with the wireless network 304. There can be a stand-alone server 622, and each server can provide separate services and processes to the client devices 300, 608, 610, 612 across the wireless network 304. System 600 may also include at least one stored application database 618 that holds the software applications, e.g., a content transfer control (CTC) application 306, that are downloadable by the wireless devices 300, 608, 610, 612 (the CTC application is indicated as being downloadable to the wireless devices by a dashed line). However, those skilled in the art will appreciate that the configuration illustrated in FIG. 6 is merely exemplary. Accordingly, other embodiments can include one of more servers that can each perform all the described functions and contain all necessary hardware and software, or can contain only selected functionality.

Figure 7:
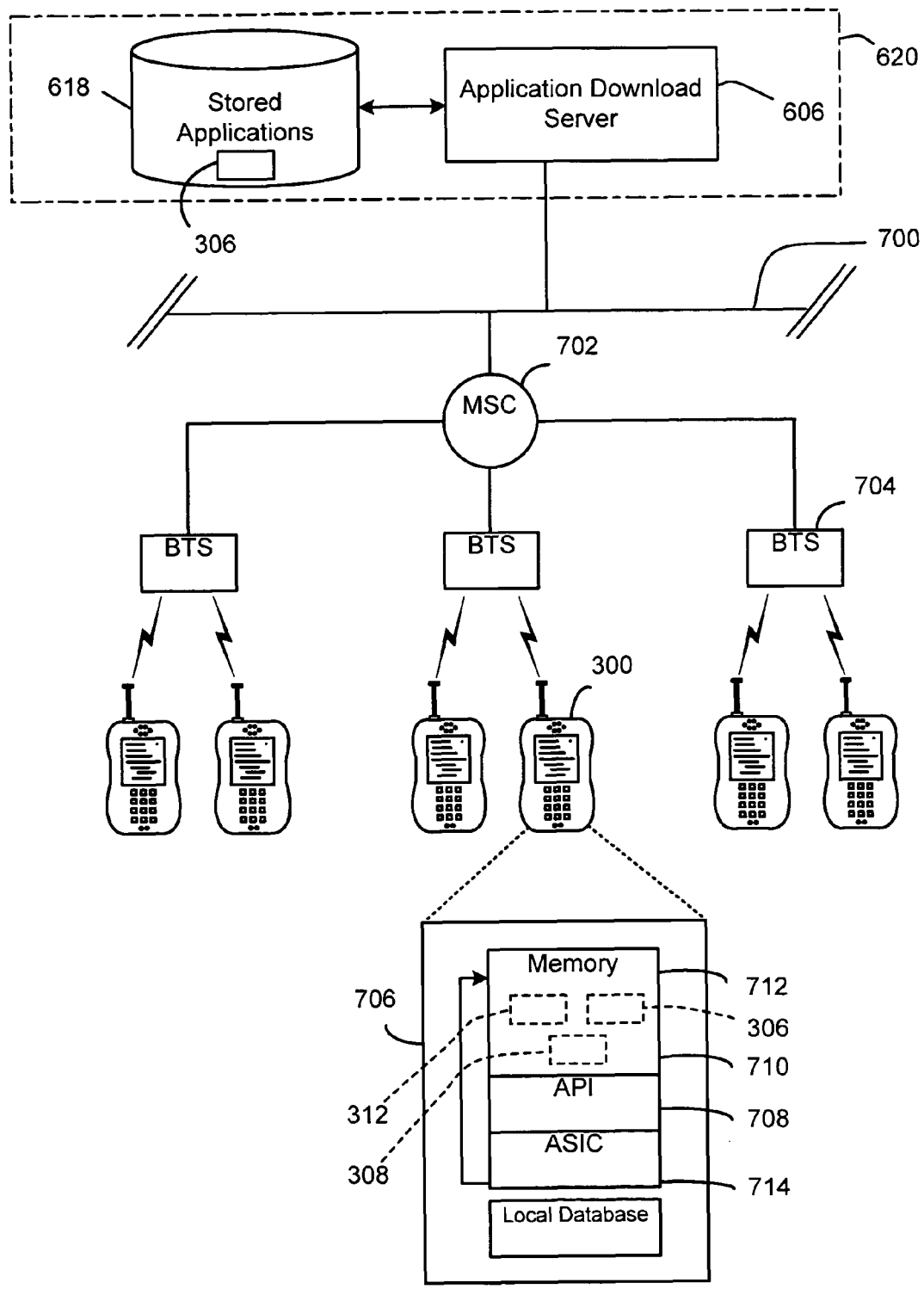
FIG. 7 is a more detailed diagram of a wireless network architecture that supports the client devices and servers in accordance with at least one embodiment.

In FIG. 7, a block diagram is shown that more fully illustrates system 600, including the components of the wireless network 304 and interrelation of the elements of the exemplary embodiments. System 600 is merely exemplary and can include any system whereby remote client devices, such as wireless client computing devices 300, 608, 610, 612 communicate over-the-air between and among each other and/or between and among components connected via a wireless network 304, including, without limitation, wireless network carriers and/or servers. The application download server 606 and the stored application database 618 communicate with a carrier network 700, through a data link, such as the Internet, a secure LAN, WAN, or other network. Stored application database 618 includes a CTC application 306 according to the above-described embodiments for download to each of the wireless client computer devices 300, 608, 610, 612. Wireless client computer devices 300, 608, 610, 612 download a copy of CTC application 306 (dashed line) from stored applications database 618. In the embodiment shown, a server 620 can include the application download server 606, distribution server 622 and the stored application database 618. However, these servers can also be independent devices.

Still referring to the embodiment of FIG. 7, carrier network 700 controls messages (generally being data packets) sent to a messaging service controller ("MSC") 702. Carrier network 700 communicates with the MSC 702 through another communications link, such as another network, the Internet, and/or POTS ("plain ordinary telephone system"). Typically, the network or Internet connection between carrier network 700 and MSC 702 transfers data, and the POTS transfers voice information. MSC 702 may be connected to multiple base stations ("BTS") 704, such as by at least one communications link, including both a data network and/or the Internet for data transfer and POTS for voice information. BTS 704 ultimately broadcasts messages wirelessly to the wireless communications devices, such as cellular telephones 602, in an over-the-air protocol such as short messaging service ("SMS"), etc.

In the embodiment of FIG. 7, each wireless device 300 may include a computer platform 706 that can receive and execute software applications and display data transmitted from computer system 620 or other network servers 622. Computer platform 706 may include an application-specific integrated circuit ("ASIC") 708, or other chipset, processor, microprocessor, logic circuit, or other data processing device. ASIC 708 may be installed at the time of manufacture of wireless device 300. ASIC 708 or other processor may execute an application programming interface ("API") layer 710 that interfaces with any resident programs, e.g., CTC application 306, in a memory 712 of the wireless device. API 710 is a runtime environment executing on the computing device, or wireless device 300 in this case. One such runtime environment is Binary Runtime Environment for Wireless® (BREW®) software, although other runtime environments may be utilized that, for example, operate to control the execution of applications on wireless computing devices. Memory 712, for example, can be comprised of at least one of read-only and random-access memory (RAM and ROM), EPROM, EEPROM, flash cards, and any memory common to computer platforms. The computer platform 706 may also include a local database 714 that can hold the software applications, e.g., CTC application 306, content 308, content container 312, files, or data not actively used in memory 712. Local database 714 may include at least one of flash memory cells, magnetic media, EPROM, EEPROM, optical media, tape, a soft disk, a hard disk, and any other type of secondary or tertiary memory. Thus, in the embodiment of FIG. 7, each wireless device 300 may be loaded with applications such as CTC application 306, content container 312, content 308, and/or data from computer system 620 in accordance with system 600.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method operating in a wireless device, comprising:
receiving content at a wireless device from an external content provider, wherein the content received from the external content provider is initially unprotected from redistribution to a destination device;
generating a header associated with the content at the wireless device in response to the receipt of the content from the external content provider, wherein the header includes a license identifier and a content source, the license identifier protecting the content from unlicensed redistribution to the destination device;
detecting a request at the wireless device for redistribution of the content to the destination device, wherein the request is based on a user manipulation of the wireless device to initiate the redistribution of the content to the destination device;
in response to detecting the request for redistribution, determining, at the wireless device, that the generated header associated with the content includes the license identifier;
determining, based on the license identifier in the generated header, that the content comprises licensed content;
in response to determining that the content comprises licensed content, determining that the content is not allowed to be redistributed to the destination device from the wireless device; and
in response to determining that the content is not allowed to be redistributed to the destination device, transferring a message not including the licensed content to the destination device, wherein the message comprises the content source specifying a location of the content on a network from which the licensed content can be downloaded.

2. A non-transitory machine readable medium having one or more instructions operational within a wireless device, which when executed by a processor causes the processor to:
receive content at the wireless device from an external content provider, wherein the content received from the external content provider is initially unprotected from redistribution to a destination device;
generate a header associated with the content at the wireless device in response to the receipt of the content from the external content provider, wherein the header includes a license identifier and a content source, the license identifier protecting the content from unlicensed redistribution to the destination device;
detect a request at the wireless device for redistribution of the content to the destination device, wherein the request is based on a user manipulation of the wireless device to initiate the redistribution of the content to the destination device;
in response to detecting the request for redistribution, determine, at the wireless device, that the generated header associated with the content includes the license identifier;
determine, based on the license identifier in the generated header, that the content comprises licensed content;
in response to determining that the content comprises licensed content, determining that the content is not allowed to be redistributed to the destination device from the wireless device; and
in response to determining that the content is not allowed to be redistributed to the destination device, transfer a message not including the licensed content to the destination device, wherein the message comprises the content source specifying the location of the content on a network from which the licensed content can be downloaded.

3. A wireless device, comprising:
a memory for storing content received from an external content provider, wherein the content received from the external content provider is initially unprotected from redistribution to a destination device; and
a content transfer control component configured to:
generate a header associated with the content at the wireless device in response to receipt of the content from the external content provider, wherein the header includes a license identifier and a content source, the license identifier protecting the content from unlicensed redistribution to the destination device;
detect a request at the wireless device for redistribution of the content to the destination device, wherein the request is based on a user manipulation of the wireless device to initiate the redistribution of the content to the destination device;
in response to detecting the request for redistribution, determine, at the wireless device, that the generated header associated with the content includes the license identifier;
determine, based on the license identifier in the generated header, that the content comprises licensed content;
in response to determining that the content comprises licensed content, determining that the content is not allowed to be redistributed to the destination device from the wireless device; and
in response to determining that the content is not allowed to be redistributed to the destination device, transfer a message not including the licensed content to the destination device, wherein the message comprises the content source specifying a location of the content on a network from which the licensed content can be downloaded.

4. The wireless device of claim 3, wherein the license identifier is generated at the wireless device based on license restrictions specified by the external content provider.

5. The wireless device of claim 3, wherein the header is encrypted and signed after it is generated at the wireless device.

6. The wireless device of claim 3, wherein the header is generated prior to the detection of the request at the wireless device for redistribution of the content to the destination device.

7. The wireless device of claim 3, wherein the message further comprises a content identifier to allow the destination device to shop for and download the content from an alternative external content provider.

8. The wireless device of claim 7, wherein the content identifier comprises one of an International Standard Book Numbering (ISBN) value or an International Standard Music Number (ISMN) value.

9. The method of claim 1, wherein the license identifier is generated at the wireless device based on license restrictions specified by the external content provider.

10. The method of claim 1, wherein the header is generated prior to detecting the request at the wireless device for redistribution of the content to the destination device.

11. The method of claim 1, wherein the message further comprises a content identifier to allow the destination device to shop for and download the content from an alternative external content provider.

12. The non-transitory machine readable medium of claim 2, wherein the license identifier is generated at the wireless device based on license restrictions specified by the external content provider.

13. The non-transitory machine readable medium of claim 2, wherein the header is generated prior to the detection of the request at the wireless device for redistribution of the content to the destination device.

14. The non-transitory machine readable medium of claim 2, wherein the message further comprises a content identifier to allow the destination device to shop for and download the content from an alternative external content provider.

* * * * *